United States Patent
Oh et al.

(10) Patent No.: US 8,261,073 B2
(45) Date of Patent: Sep. 4, 2012

(54) DIGITAL RIGHTS MANAGEMENT METHOD AND APPARATUS

(75) Inventors: Yun-sang Oh, Seoul (KR); Sang-gyoo Sim, Suwon-si (KR); Suk-bong Lee, Suwon-si (KR); Yeo-jin Kim, Suwon-si (KR); Kyung-im Jung, Seongnam-si (KR); Ji-soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 880 days.

(21) Appl. No.: 11/747,623

(22) Filed: May 11, 2007

(65) Prior Publication Data

US 2007/0263869 A1 Nov. 15, 2007

Related U.S. Application Data

(60) Provisional application No. 60/799,652, filed on May 12, 2006.

(30) Foreign Application Priority Data

Apr. 19, 2007 (KR) .......................... 10-2007-0038427

(51) Int. Cl.
*H04L 29/06* (2006.01)

(52) U.S. Cl. ........ 713/168; 713/169; 713/170; 713/171; 713/172; 713/173; 726/27; 726/28; 726/29; 726/30; 380/231; 380/232

(58) Field of Classification Search .................... 713/168
See application file for complete search history.

(56) References Cited

U.S. PATENT DOCUMENTS

| 5,793,868 | A * | 8/1998 | Micali .............................. 380/28 |
| 6,931,528 | B1* | 8/2005 | Immonen ....................... 713/151 |
| 2001/0005682 | A1* | 6/2001 | Terao et al. .................... 455/550 |
| 2008/0056494 | A1* | 3/2008 | Jacobson et al. ............. 380/255 |

FOREIGN PATENT DOCUMENTS

| JP | 6-261033 A | 9/1994 |
| JP | 2001-298448 A | 10/2001 |
| JP | 2003-115840 A | 4/2003 |
| JP | 2004-287492 A | 10/2004 |
| KR | 10-2003-0030586 A | 4/2003 |
| KR | 10-2005-0094316 A | 9/2005 |
| WO | 2005/091162 A1 | 9/2005 |
| WO | WO 2005/091162 A1 * | 9/2005 |

OTHER PUBLICATIONS

Draft-IETF-TLS-Protocol-03 (Dierks, draft-IETF-TLS-Protocol-03, Mar. 1997.*
Office Action dated Jul. 12, 2011 from the Japanese Patent Office in counterpart Japanese application No. 2009-509443.

* cited by examiner

*Primary Examiner* — Longbit Chai
(74) *Attorney, Agent, or Firm* — Sughrue Mion, PLLC

(57) ABSTRACT

Provided are a digital rights management (DRM) method and apparatus, and more particularly, a DRM method and apparatus which can support different DRMs and use various digital content. The DRM method includes receiving a hello message request from a host device; comparing information included in the hello message request to information stored in advance; generating an error code when the hello message request contains unsupported information; and generating a hello message response that contains the error code.

29 Claims, 8 Drawing Sheets

FIG. 2

| PARAMETERS | PROTECTION REQUIREMENT | DESCRIPTION |
|---|---|---|
| PROTOCOL VERSION | NONE | 1-BIT CHARACTER STRING "SRM1.0" |
| Root CA ID | NONE | HASH OF PUBLIC KEY OF ROOT CERTIFICATE IN DEVICE CERTIFICATE CHAIN. DEFAULT HASH ALGORITHM IS SHA-1.<br>USED TO IDENTIFY ONE OF ALL CAs SUPPORTED BY HOST DEVICE. |
| CRL INFORAMTION LIST | NONE | CRL INFORMATION INCLUDES PAIR OF CRL ISSUER ID AND CRL NUMBER.<br>CRL INFORMATION LIST INCLUDES CRL INFORMATION OF ALL CRLs OF HOST DEVICE.<br>CRL ISSUER ID IS 160-BIT SHA-1 HASH OF PUBLIC KEY THAT CORRESPONDS TO PRIVATE KEY USED TO SIGN CRL. DEFAULT HASH ALGORITHM IS SHA-1.<br>CRL NUMBER IS INTEGER AND USED TO DETERMINE TIME TO REPLACE CRL WITH ANOTHER CRL. |

FIG. 3

| PARAMETERS | PROTECTION REQUIREMENT | DESCRIPTION |
|---|---|---|
| PROTOCOL VERSION | NONE | 1-BIT CHARACTER STRING "SRM 1.0" |
| CRL INFORAMTION LIST | NONE | CRL INFORMATION INCLUDES PAIR OF CRL ISSUER ID AND CRL NUMBER. CRL INFORMATION LIST INCLUDES CRL INFORMATION OF ALL CRLs OF HOST DEVICE. CRL ISSUER ID IS 160-BIT SHA-1 HASH OF PUBLIC KEY THAT CORRESPONDS TO PRIVATE KEY USED TO SIGN CRL. DEFAULT HASH ALGORITHM IS SHA-1. CRL NUMBER IS INTEGER AND USED TO DETERMINE TIME TO REPLACE CRL WITH ANOTHER CRL. NOTE: THIS FIELD IS DISPLAYED ONLY WHEN ERROR CODE INDICATES 'NO ERROR.' |
| ROOT CA IDs LIST | NONE | ROOT CA ID LIST INCLUDES CA IDs OF ALL CAs SUPPORTED BY SRM ROOT CA ID IS HASH OF PUBLIC KEY OF ROOT CERTIFICATE IN DEVICE CERTIFICATE CHAIN. DEFAULT HASH ALGORITHM IS SHA-1. NOTE: THIS FIELD IS DISPLAYED ONLY WHEN ERROR CODE INDICATES 'INVALID ROOT CA ID.' |
| ERROR CODE | NONE | SEE TABLE 4 |

FIG. 4

| ERROR CODE | DESCRIPTION |
|---|---|
| NO ERROR | NO ERROR HAS OCCURRED WHEN HOST DEVICE IS ONNECTED TO PORTABLE STORAGE DEVICE |
| INVALID PROTOCOL VERSION | PORTABLE STORAGE DEIVCE DOES NOT SUPPORT CORRESPONDING PROTOCOL VERSION |
| INVALID ROOT CA ID | PORTABLE STORAGE DEVICE DOES NOT SUPPORT CORRESPONDING ROOT CA ID |
| UNKNOWN ERROR | OTHER ERRORS |

DIGITAL RIGHTS MANAGEMENT METHOD AND APPARATUS

CROSS REFERENCE TO RELATED APPLICATION

This application is based on, and claims priority from Korean Patent Application No. 10-2007-0038427 filed on in the Korean Intellectual Property Office and Apr. 19, 2007 and U.S. Provisional Application No. 60/799,652 filed on May 12, 2006 in the United States Patent and Trademark Office, the disclosures of which are incorporated herein in their entireties by reference.

BACKGROUND OF THE INVENTION

1. Field of the Invention

Methods and apparatuses consistent with the present invention relate to a digital rights management (DRM), and more particularly, to a DRM method and apparatus which can support different DRMs and use various digital content.

2. Description of the Related Art

Recently digital rights management (hereinafter referred to as "DRM") has been researched actively and commercial services using DRM have already been implemented or will be implemented. DRM is a technical concept to protect digital content that can be readily copied and distributed without permission.

Some efforts have been made to protect digital content. Conventionally, digital content protection has concentrated on preventing those without permission from accessing digital content. Specifically, only those people who have paid fees are permitted to access the digital content, and persons who have not paid the charges are denied access the digital content. However, the digital content can be readily copied, reused, processed and distributed to third parties according to the characteristics of the digital data. Accordingly, when a person who has paid the fees accesses the digital content and intentionally distributes it to a third party, the third party can use the digital content without paying the fees, which has produced a number of problems.

In order to solve these problems, in DRM, the digital content is encrypted and distributed, and a specified license called a rights object (RO) is needed to use the encrypted digital content.

A rights object stored in a host device can be moved or copied to a portable storage device. Portable storage devices, such as extreme Digital (XD) cards and multimedia cards, can be easily inserted into or removed from host devices such as mobile phones, computers and digital cameras. Portable storage devices go beyond the bounds of conventional hard disks and compact disks. That is, portable storage devices cannot only store data but also perform computing functions such as data control and operation. Recently, new-concept portable storage devices that combine a security function with the existing portable storage devices are being developed. The new-concept portable storage devices can protect digital copyright by securing the storage and transmission or reception of digital content. Accordingly, DRM can be applied to the relationship between a portable storage device and a host device. That is, a rights object can be stored in a portable storage device, and a host device can play back encrypted content using the rights object stored in the portable storage device.

SUMMARY OF THE INVENTION

It is an aspect of the present invention to support root certificates and root certification authority (CA) IDs issued by one or more root CAs and thus support various digital rights managements (DRMs).

It is another aspect of the present invention to enable a host device and a portable storage device to exchange hello messages in order to sense each other.

However, the aspects of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided a DRM method including receiving a hello message request from a host device; comparing information included in the hello message request to information stored in advance; generating an error code when the hello message request contains unsupported information; and generating a hello message response that contains the error code.

According to another aspect of the present invention, there is provided a DRM method including receiving a hello message response from a portable storage device; checking whether the hello message response contains an error code; comparing information contained in the hello message response to information stored in advance if the hello message response contains the error code; and selecting information, which is identical to information supported by the portable storage device, from the compared information.

According to another aspect of the present invention, there is provided a portable storage device including a transmission/reception unit receiving a hello message request from a host device; an information check unit comparing information included in the hello message request to information stored in advance; an error code generation unit generating an error code when the hello message request contains unsupported information; and a message generation unit generating a hello message response that contains the error code.

According to another aspect of the present invention, there is provided a host device including a transmission/reception unit receiving a hello message response from a portable storage device; an information check unit comparing information contained in the hello message response to information stored in advance; and a control unit selecting information, which is identical to information supported by the portable storage device, from the compared information if the hello message response contains an error code.

According to another aspect of the present invention, there is provided a DRM apparatus including a portable storage device receiving a hello message request from a host device, comparing information included in the hello message request to information stored in advance, and generating a hello message response; and a host device receiving the hello message response from the portable storage device and selecting information, which is identical to information supported by the portable storage device, from compared information if the hello message response contains an error code.

BRIEF DESCRIPTION OF THE DRAWINGS

The above and other features and aspects of the present invention will become more apparent by describing in detail exemplary embodiments thereof with reference to the attached drawings in which:

FIG. 2 illustrates a hello message request transmitted from a host device to a portable storage device according to an exemplary embodiment of the present invention;

FIG. 3 illustrates a hello message response transmitted from a portable storage device to a host device according to an exemplary embodiment of the present invention;

FIG. 4 illustrates an error code included in a hello message response transmitted from a portable storage device to a host device according to an exemplary embodiment of the present invention;

DETAILED DESCRIPTION OF THE INVENTION

Figure 1:
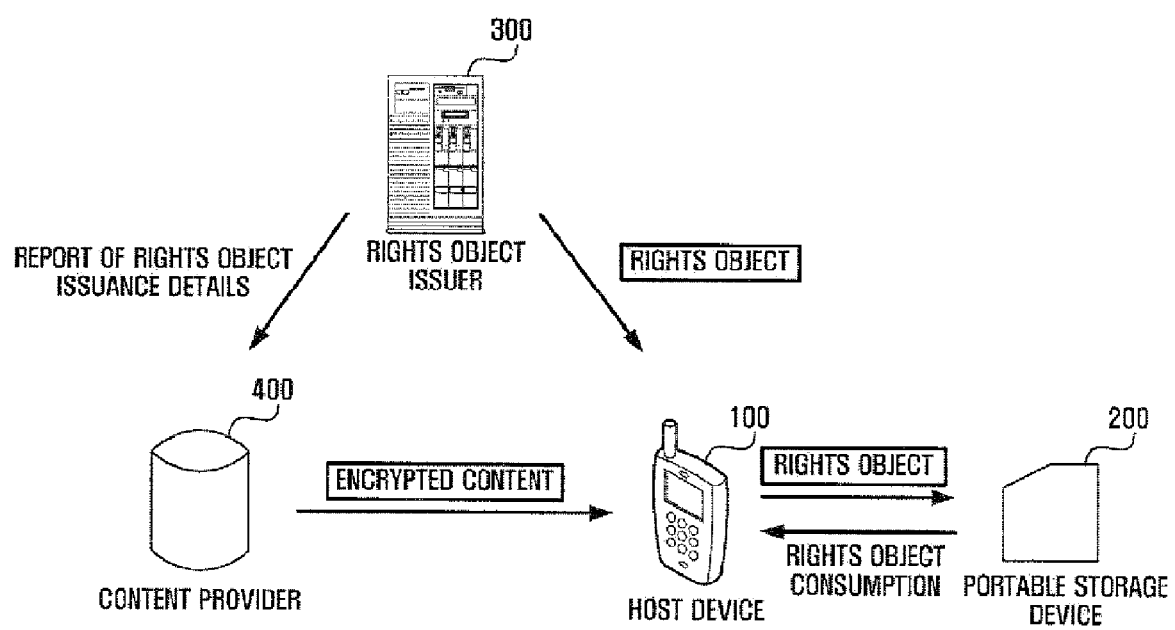
FIG. 1 illustrates a DRM concept according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Several terms used herein will first be described in a brief manner for a better understanding of the present description. Thus, it should be noted that this description is not intended to limit the scope of protection of the present invention as defined by the appended claims.

Host Device

The host device used in the present invention refers to a multimedia device capable of directly using content object through a rights object stored in the portable storage device, and which can be connected to the portable storage device. Examples of such a host device are a mobile phone, PDA, notebook computer, desktop computer, and a digital TV.

Portable Storage Device

The portable storage device used in the present invention comprises a non-volatile memory with the properties of being readable, writable and erasable, like a flash memory, it has specified data operations, and is a storage device that can be connected to a host device. Examples of such a storage device are smart media, memory sticks, compact flash (CF) cards, extreme Digital (XD) cards, and multimedia cards.

Rights Object

A rights object is a sort of license defining the rights of use of a content object, using constraint information about the content object, copy constraint information of the rights object, a rights object ID, a content ID, and others Certificate Revocation List (CRL)

A certification authority (CA) issues a list of revoked certificates (hereinafter, referred to as a certificate revocation list (CRL)). The CRL is mentioned in the International Organization for Standardization (ISO)/the International Electrotechnical Commission (IEC) 9495-8 and has a format defined by the International Telecommunications Union-Telecommunication Standardization Sector (ITU-T) Recommendation X.509 (The CRL has a format defined by the International Telecommunications Union-Telecommunication Standardization Sector (ITU-T) Recommendation X.509, formally referred to as the International Organization for Standardization (ISO)/the International Electrotechnical Commission (IEC) 9495-8).

The CRL includes a version, a signature algorithm ID, an issuer name, this update, next update, revoked certificates, CRL extensions and a signature as basic fields.

FIG. 1 illustrates a digital rights management (DRM) concept according to an exemplary embodiment of the present invention.

A user can obtain a content object from a content provider 400 through a host device 100. Also, the user can purchase a rights object that can execute the content object from a rights object issuer 300. The host device 100 and the rights object issuer 300 communicate with each other using a rights object acquisition protocol (ROAP) defined by [OMADRMv2].

The purchased rights object may be stored in the host device 100 or a portable storage device 200 according to an exemplary embodiment of the present invention. In addition, one or more rights objects may be stored in the portable storage device 200 upon manufacture.

In this case, the host device 100 may consume a rights object stored in portable storage device 200 in order to use a content object. That is, when the host device 100 is connected to the portable storage device 200, it may consume the rights object stored in the portable storage device 200. In some cases, the rights object stored in the portable storage device 200 may be moved or copied to another host device (not shown).

The host device 100 and the portable storage device 200 may receive root certificates and root certification authority (CA) IDs from one or more root CAs. Accordingly, the host device 100 and the portable storage device 200 can support different DRMs and use various digital content.

If the portable storage device 200 is used, host devices can easily share the rights object within the limited range of the use constraint information or the copy constraint information set in the rights object. Additionally, by storing the rights objects in the portable storage device 200, the data storage capability of the host device 100 can be improved and the rights objects can be managed easily. When the host device 100 is connected to the portable storage device 200, it transmits a hello message request to the portable storage device 200 in order to sense the portable storage device 200. Accordingly, the portable storage device 200 transmits a hello message response to the host device 100. The hello message request and the hello message response exchanged between the host device 100 and the portable storage device 200 will now be described with reference to FIGS. 2 and 3.

The host device 100 performs a mutual authentication with the portable storage device 200 before it is linked to and exchanges data with the portable storage device 200. The mutual authentication is a basic process for maintaining the security of data that is exchanged between the host device 100 and the portable storage device 200, which will be described later with reference to FIG. 7.

FIG. 2 illustrates a hello message request transmitted from a host device 100 to a portable storage device 200 according to an exemplary embodiment of the present invention.

The hello message request transmitted from the host device 100 to the portable storage device 200 includes a protocol version, a root CA ID, and list of a CRL information.

Referring to FIG. 2, the protocol version refers to version information of a communication protocol of the host device 100 and is indicated as a 1-bit character string (for example, SRM1.0). The root CA ID indicates a hash of a public key of a root certificate in a device certificate chain and is used to identify one of all CAs supported by the host device 100. Here, a default hash algorithm is SHA-1.

The CRL information list includes CRL information of all CRLs in the host device 100. The host device 100 may have CRL information issued by one or more CRL issuers. The CRL information includes a pair of a CRL issuer ID and a CRL number. The CRL issuer ID is a 160-bit SHA-1 hash of a public key that corresponds to a private key used to sign a CRL, and the default hash algorithm is SHA-1. In addition, the CRL number is an integer and used to determine the time to replace a CRL with another CRL.

FIG. 3 illustrates a hello message response transmitted from a portable storage device 200 to a host device 100 according to an exemplary embodiment of the present invention.

The hello message response transmitted from the portable storage device 200 to the host device 100 includes a protocol version, a CRL information list, a root CA ID list, and an error code.

Referring to FIG. 3, the protocol version refers to version information of a communication protocol of the portable storage device 200 and is indicated as a 1-bit character string (for example, SRM1.0).

The CRL information list includes CRL information of all CRLs in the portable storage device 200. The portable storage device 200 may have CRL information issued by one or more CRL issuers. The CRL information includes a pair of a CRL issuer ID and a CRL number. The CRL issuer ID is a 160-bit SHA-1 hash of a public key that corresponds to a private key used to sign a CRL, and the default hash algorithm is SHA-1. In addition, the CRL number is an integer and used to determine the time to replace a CRL with another CRL. The CRL information list is displayed only when the error code indicates 'no error.'

The root CA ID list includes CA IDs of all CAs supported by the portable storage device 200. A root CA ID indicates a hash of a public key of a root certificate in a device certificate chain, and the default hash algorithm is SHA-1. In addition, the portable storage device 200 supports root certificates and root CA IDs issued by one or more root CAs. The root CA ID list is displayed only when the error code indicates 'invalid root CA ID.'

The error code is displayed only when the portable storage device 200 has a problem. The error code will now be described in detail with reference to FIG. 4.

FIG. 4 illustrates an error code included in a hello message response transmitted from a portable storage device 200 to a host device 100 according to an exemplary embodiment of the present invention.

Referring to FIG. 4, the error code is classified into error codes 'no error,' 'invalid protocol version,' 'invalid CA ID' and 'unknown error.'

The error code 'no error' indicates that no error has occurred when the host device 100 is connected to the portable storage device 200. The error code 'invalid protocol version' indicates that the portable storage device 200 does not support a protocol version received from the host device 100 through a hello message request.

In addition, the error code 'invalid root CA ID' indicates that the portable storage device 200 does not support a root CA ID received from the host device 100 through the hello message request. The error code 'unknown error' indicates errors other than the errors mentioned above.

Figure 5:
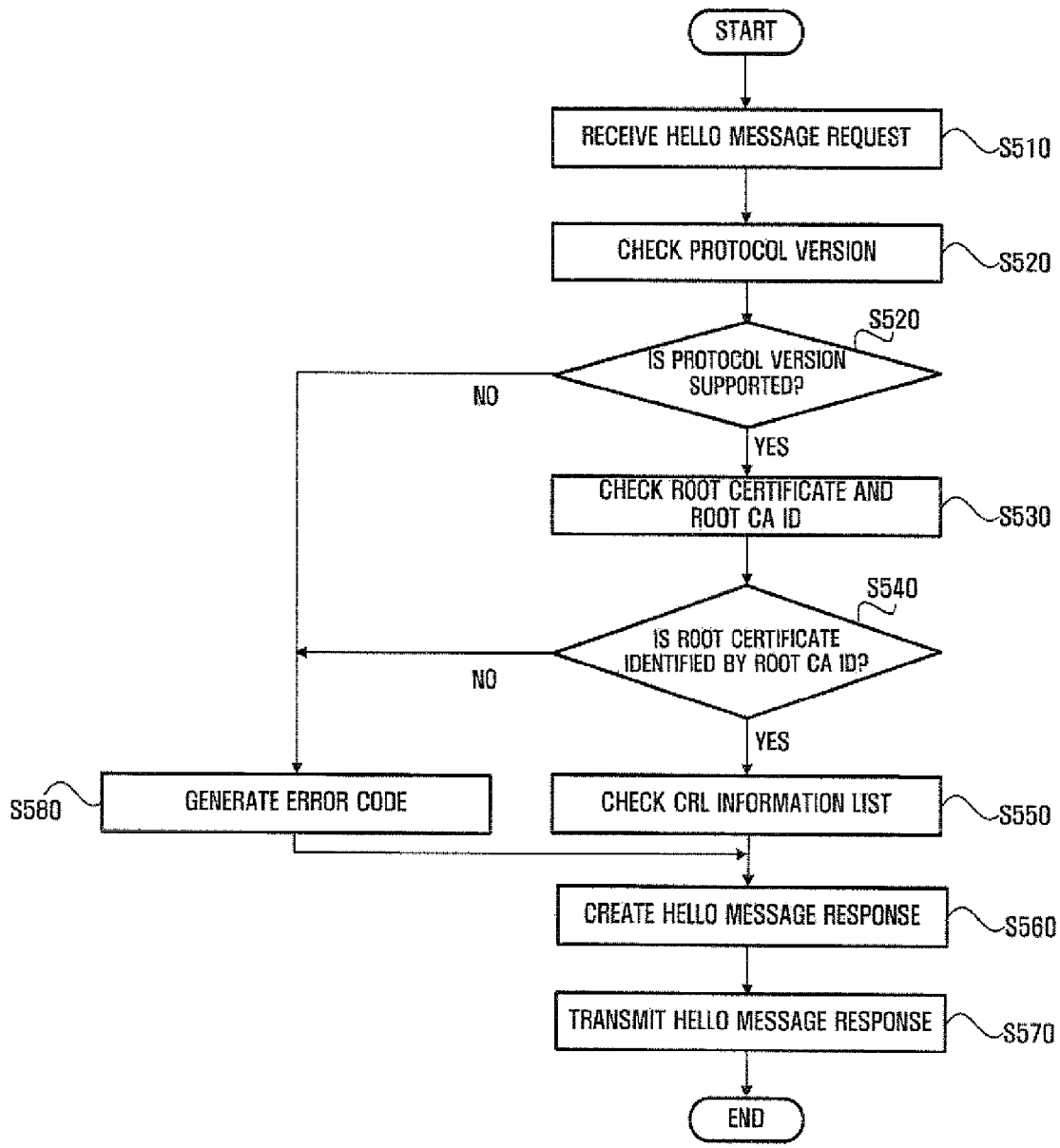
FIG. 5 is a flowchart illustrating a process of processing a hello message request received from a host device using a portable storage device according to an exemplary embodiment of the present invention.

FIG. 5 is a flowchart illustrating a process of processing a hello message request received from a host device 100 using a portable storage device 200 according to an exemplary embodiment of the present invention. In the present embodiment, after the host device 100 is connected to the portable storage device 200, it transmits the hello message request to the portable storage device 200 in order to sense the portable storage device 200.

Referring to FIG. 5, the portable storage device 200 receives the hello message request from the host device 100 (operation S510). The hello message request includes a protocol version, a root CA ID, and a CRL information list.

Next, the portable storage device 200 checks information contained in the received hello message request.

For example, the portable storage device 200 checks whether it can support a protocol version of the host device 100 (operation S520). If the portable storage device 200 determines that it cannot support the protocol version of the host device 100, it generates the error code 'invalid protocol version' (operation S580). If the portable storage device 200 determines that it can support the protocol version of the host device 100, it performs operation S530.

Then, the portable storage device 200 checks whether it can identify a root certificate issued by a root CA by a root CA ID of the host device 100 (operation S530).

If the portable storage device 200 determines that it cannot identify the root certificate by the root CA ID of the host device 100, it generates the error code 'invalid root CA ID' (operation S580). If the portable storage device 200 determines that it can identify the root certificate by the root CA ID of the host device 100, it performs operation S550.

The portable storage device 200 compares a CRL information list of the host device 100 to its CRL information list (operation S550).

For example, the portable storage device 200 checks whether a CRL issuer ID for each piece of CRL information included in the CRL information list of the host device 100 also exists in its CRL information list. If the portable storage device 200 determines that the CRL issuer ID for each piece of CRL information included in the CRL information list of the host device 100 also exists in its CRL information list, it compares its CRL number (e.g., a CRL issuance date) to that of the host device 100 and checks whether its CRL issuance date is later than that of the host device 100.

Next, the portable storage device 200 creates a hello message response (operation S560). The hello message response includes a protocol version, a CRL information list, a root CA ID list, and an error code. The error code included in the hello message response is generated in operation S580 described above.

The portable storage device 200 transmits the created hello message response to the host device 100 (operation S570).

The order in which the operation of checking the protocol version, the operation of determining whether a root certificate can be identified by a root CA ID, and the operation of checking the CRL information list, which have been described above in operations S520 through S550, are performed may be changed.

Figure 6:
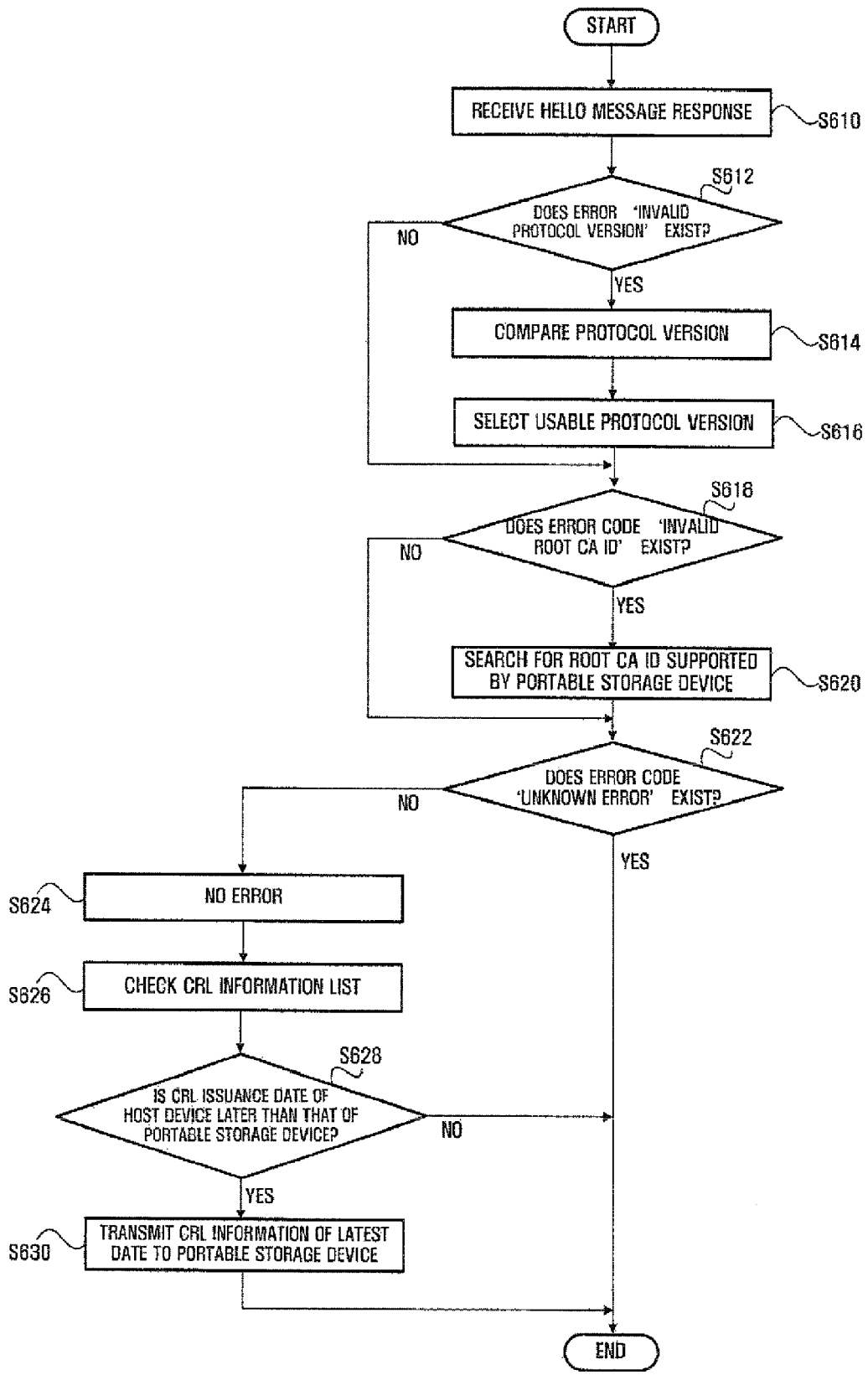
FIG. 6 is a flowchart illustrating a process of processing a hello message response received from a portable storage device using a host device according to an exemplary embodiment of the present invention.

FIG. 6 is a flowchart illustrating a process of processing a hello message response received from a portable storage device 200 using a host device 100 according to an exemplary embodiment of the present invention.

Referring to FIG. 6, the host device 100 receives the hello message response from the portable storage device 200 (operation S610). The hello message response includes a protocol version, a CRL information list, a root CA ID list, and an error code.

Next, the host device 100 checks information included in the received hello message response.

If the host device 100 determines that the hello message response has an error code, it checks whether the error code is the error code 'invalid protocol version.'

If determining that the error code is the error code 'invalid protocol version' (operation S612), the host device 100 compares its protocol version to that of the portable storage device 200 (operation S614). Then, the host device 100 selects a protocol version in which it can communicate with the portable storage device 200 (operation S616).

For example, if the protocol version of the host device 100 is 1.2 and that of the portable storage device 200 is 1.0, the host device 100 selects protocol version 1.0 in order to communicate with the portable storage device 200. In this case, the highest protocol version in which two apparatuses (or devices) can communicate with each other is selected.

In the case of 'no' to a question raised in operation S612, operation S618 is performed. If determining that the error code is the error code 'invalid root CA ID' (operation S618), the host device 100 searches for a root CA ID supported by the portable storage device 200 (operation S620).

In the case of 'no' to a question raised in operation S618, operation S622 is performed. If determining that the error code is the error code 'unknown error' (operation S622), the host device 100 terminates all operations.

In the case of 'no' to a question raised in operation S622, the host device 100 determines that the error code is the error code 'no error' (operation S624).

Then, the host device 100 compares its CRL information list to that of the portable storage device 200 (operation S626). If the host device 100 determines that its CRL issuance date is later than that of the portable storage device 200 (operation S628), it transmits CRL information of the latest date to the portable storage device 200 (operation S630).

Conversely, if the host device 100 determines that its CRL issuance date is not later than that of the portable storage device 200, it terminates all operations.

The order in which the operations of checking the error code, which have been described above in operations S612 through S622, are performed may be changed.

Figure 7:
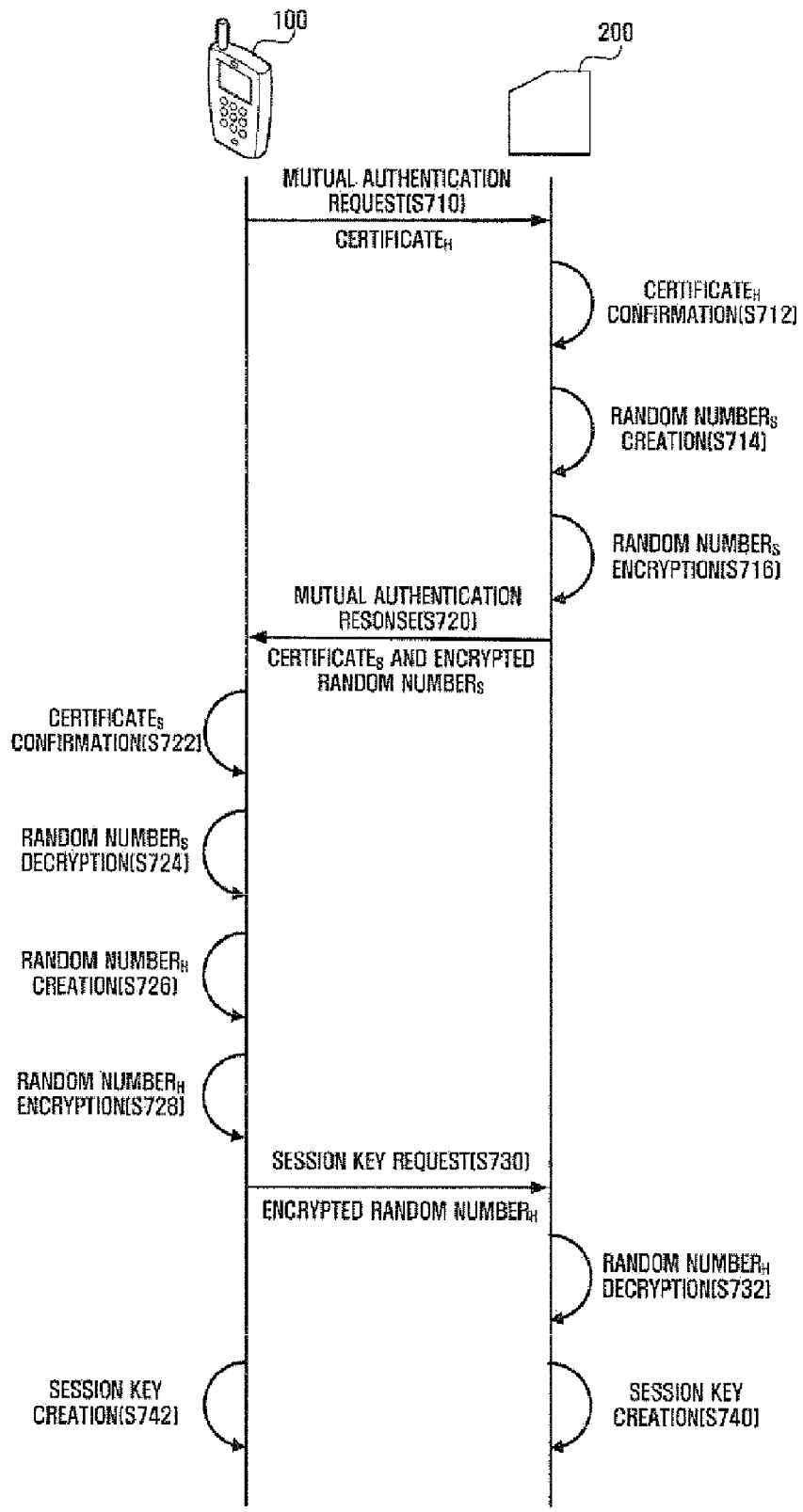
FIG. 7 is a flowchart illustrating a mutual authentication process between a host device and a portable storage device according to an exemplary embodiment of the present invention.

FIG. 7 is a flowchart illustrating a mutual authentication process between a host device 100 and a portable storage device 200 according to an exemplary embodiment of the present invention. The mutual authentication process is performed after the host device 100 and the portable storage device 200 exchange a hello message request and a hello message response with each other.

In explaining the mutual authentication with reference to FIG. 7, a subscript "H" means that data belongs to the host device 100 or is created by the host device 100, and a subscript "S" means data that belongs to the portable storage device 200 or is created by the portable storage device 200.

The host device 100 and the portable storage device 200 may have their own pair of encryption keys, which are used for public-key encryption.

The host device 100 first sends a request for mutual authentication to the portable storage device 200 (operation S710). Along with the request for mutual authentication, the host device 100 sends the portable storage device 200 its public key. The public key of the host device 100 may be sent through a certificate$_H$ of the host device 100 issued by a certification authority.

The portable storage device 200 that has received the certificate$_H$ can ascertain whether the host device 100 is authorized, and can obtain the public key of the host device 100 from the certificates.

The portable storage device 200 confirms the certificate$_H$ of the host device 100 (operation S712). In this case, the portable storage device 200 judges if the term of validity of the certificate$_H$ of the host device 100 has expired, and confirms that the certificates is valid using a CRL. If the certificate$_H$ of the host device 100 is no longer valid or it is registered in the CRL, the portable storage device 200 can reject mutual authentication with the host device 100. In addition, the portable storage device 200 authenticates a signature on the certificate$_H$ and determines whether the certificate$_H$ is valid. By contrast, if it is confirmed that the certificate$_H$ of the host device 100 is valid, the portable storage device 200 can obtain the public key of the host device 100 from the certificate$_H$.

Upon confirming the validity of the certificate$_H$, the portable storage device 200 creates a random number$_S$ (operation S714) in order to answer the request for mutual authentication, and encrypts the created random number$_S$ with the public key of the host device 100 (operation S716).

The encrypted random numbers is transmitted to the host device 100 together with the public key of the portable storage device 200 as a response to the mutual authentication request (operation S720). In this case, the public key of the portable storage device 200 may also be included in the certificates of the portable storage device 200 to be transmitted to the host device 100.

Using its CRL, the host device 100 can confirm that the portable storage device 200 is an authorized device by confirming the validity of the certificate$_S$ of the portable storage device 200 (operation S722). Meanwhile, the host device 100 can obtain the public key of the portable storage device 200 through the certificate of the portable storage device 200, and it can obtain the random number$_S$ by decrypting the encrypted random number$_S$ with its private key (operation S724).

The host device 100 having confirmed that the portable storage device 200 is an authorized device also creates a random number$_H$ (operation S726), and encrypts the random number$_H$ with the public key of the portable storage device 200 (operation S728).

Thereafter, the host device 100 transmits the encrypted random number$_H$ along with a request for session key creation (operation S730).

The portable storage device 200 receives and decrypts the encrypted random number$_S$ number$_H$ with its private key (operation S732). Accordingly, the host device 100 and the portable storage device 200 can share the random numbers they created and the random numbers created by their counterparts, and a session key can be created using the two random numbers (random number$_H$ and random number$_S$) (operations S740 and S742). In the present embodiment, both the host device 100 and the portable storage device 200 create random numbers that are then used to create the session key, whereby the overall randomness is greatly increased, thereby making the mutual authentication more secure.

The host device 100 and the portable storage device 200 having created the session keys may confirm that the session key created by one party is the same as that of its counterpart.

The host device 100 and the portable storage device 200 having shared the session key can encrypt the data to be transmitted between them with the session key, and they can decrypt the received data with the session key, so that security can be ensured during data transmission.

Mutual authentication as described above is just an example of a process in which the host device 100 and the portable storage device 200 mutually confirm that they are authorized devices and share the session key. Accordingly, in order to create a common session key, a mutual authentication process similar to this may be performed.

Symmetric key encryption may be used for the aforementioned process. However, the present invention is not limited thereto. The host device 100 and the portable storage device 200 may use a public key encryption method whereby the host device 100 or the portable storage device 200 encrypt data to be transmitted with a public key of the portable storage device 200 or the host device 100 and decrypt the received data with their private keys.

Figure 8:
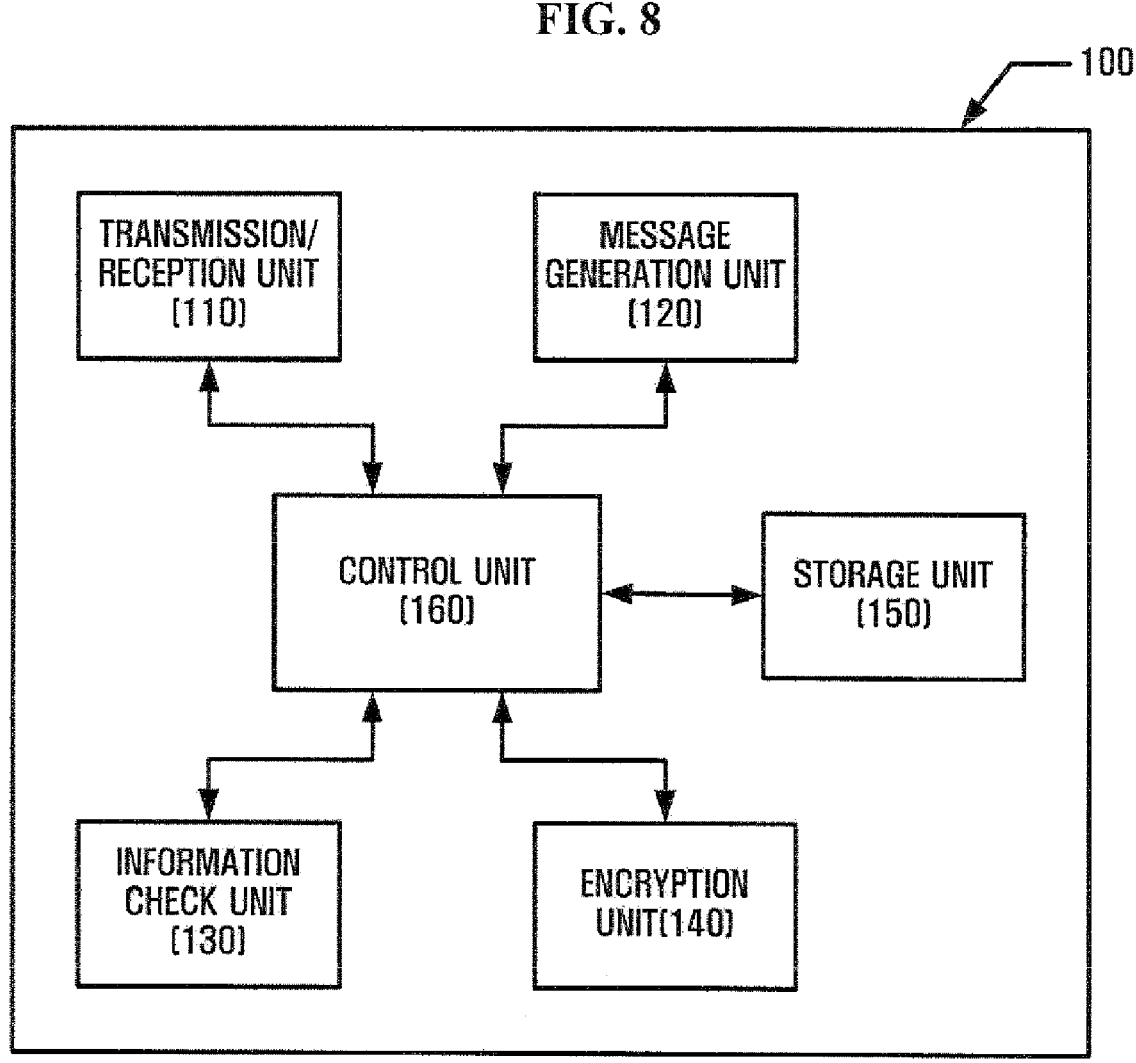
FIG. 8 is a block diagram of a host device according to an exemplary embodiment of the present invention.

FIG. 8 is a block diagram of a host device 100 according to an exemplary embodiment of the present invention.

Referring to FIG. 8, the host device 100 includes a transmission and reception unit 110, a message generation unit 120, an information check unit 130, an encryption unit 140, a storage unit 150, and a control unit 160.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented to execute one or more central processing units (CPUs) in a device or a portable storage device.

The transmission and reception unit 110 transmits a hello message request to a portable storage device 200 and receives a hello message response from the portable storage device 200.

In addition, the transmission and reception unit 110 enables the host device 100 to wirelessly communicate or communicate via wire, with a content issuer or a rights object issuer and receives a rights object or a content object from an external source or the portable storage device 200.

After the host device 100 is connected to the portable storage device 200, the message generation unit 120 generates the hello message request in order to sense the portable storage device 200. The hello message request includes a protocol version, a root CA ID, and a CRL information list.

The information check unit 130 compares information (e.g., a protocol version, a CRL information list, a root CA ID list, and an error code) contained in the hello message response received from the portable storage device 200 to information stored in the storage unit 150. If the hello message response includes an error code, the information check unit 130 compares the protocol version and root CA ID of the portable storage device 200 to those stored in the storage unit 150. If the hello message response does not include the error code, the information check unit 130 checks only CRL information lists of the host device 100 and the portable storage device 200.

For example, if the hello message response includes the error code 'invalid protocol version,' the information check unit 130 compares the protocol version of the host device 100 to that of the portable storage device 200. In addition, if the hello message response includes the error code 'invalid root CA ID,' the information check unit 130 searches for a root CA ID supported by the portable storage device 200 and thus checks whether the host device 100 can support the root CA ID.

The encryption unit 140 encrypts data to be transmitted to the portable storage device 200 at the request of the control unit 160 or decrypts encrypted data received from the portable storage device 200. In addition, the encryption unit 140 may create random numbers required during the mutual authentication process.

The storage unit 150 stores the protocol version, root CA ID and CRL information list of the host device 100. Additionally, the storage unit 150 stores encrypted content, rights objects, and a root certificate of the host device 100.

The control unit 160 selects a protocol version in which the host device 100 can communicate with the portable storage device 200 when a protocol version error occurs. In addition, the control unit 160 disconnects the host device 100 from the portable storage device 200 when there occurs an unknown error.

If the issuance date of the CRL information of the portable storage device 200 is not later than that of its CRL information, the control unit 160 transmits CRL information of the latest date to the portable storage device 200 so that the portable storage device 200 can update the CRL information accordingly.

The control unit 160 also controls the mutual authentication process between the host device 100 and the portable storage device 200.

If the host device 100 is connected to the portable storage device 200, the control unit 160 controls the operation of each of the transmission and reception unit 110, the message generation unit 120, the information check unit 130, the encryption unit 140 and the storage unit 150 that form the host device 100.

Figure 9:
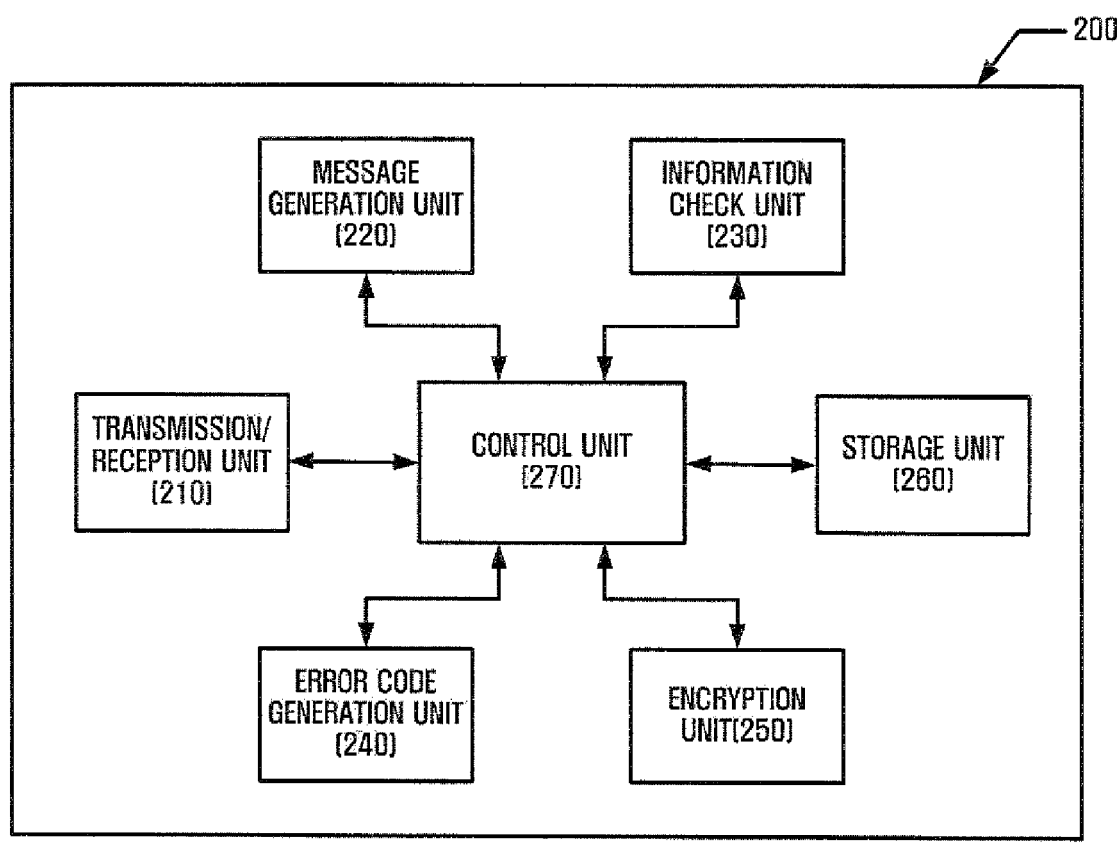
FIG. 9 is a block diagram of a portable storage device according to an exemplary embodiment of the present invention.

FIG. 9 is a block diagram of a portable storage device 200 according to an exemplary embodiment of the present invention.

Referring to FIG. 9, the portable storage device 200 includes a transmission and reception unit 210, a message generation unit 220, an information check unit 230, an error code generation unit 240, an encryption unit 250, a storage unit 260, and a control unit 270.

The transmission and reception unit 210 transmits a hello message response to a host device 100 and receives a hello message request from the host device 100.

The message generation unit 220 generates the hello message response to be transmitted to the host device 100. The hello message response includes a protocol version, a CRL information list, a root CA ID list, and an error code. After the information check unit 230 compares and checks the protocol versions, CRL information and root CA IDs of the portable storage device 200 and the host device 100, the message generation unit 220 includes a corresponding error code in the hello message response.

The information check unit 230 compares information (e.g., a protocol version, a root CA ID and a CRL information list) contained in a hello message request received from the host device 100 to information stored in the storage unit 260. If the hello message request includes invalid information, the information check unit 230 transmits the invalid information to the error code generation unit 240.

If the information check unit 230 determines that the hello message request includes the invalid information and if an error occurs, the error code generation unit 240 generates an error code. The error code may be classified into the error codes 'no error,' 'invalid protocol version,' 'invalid CA ID' and 'unknown error.'

The encryption unit 250 encrypts data to be transmitted to the host device 100 at the request of the control unit 270 or decrypts encrypted data received from the host device 100. In addition, the encryption unit 250 may create random numbers required during the mutual authentication process.

The storage unit 260 stores the protocol version, CRL information list, root CA ID list, error code, and root certificate of the portable storage device 200.

The control unit 270 controls the operation of each of the transmission and reception unit 210, the message generation unit 220, the information check unit 230, the error code generation unit 240, the encryption unit 250 and the storage unit 260. In addition, the control unit 270 controls the mutual authentication process between the host device 100 and the portable storage device 200.

As described above, a DRM apparatus and method according to the present invention provide at least one of the following aspects.

Since the DRM method and apparatus support root certificates and root CA IDs issued by one or more root CAs, they can also support different DRMs and use various digital content.

In addition, a host device and a portable storage device exchange hello messages in order to sense each other. Therefore, the host device and the portable storage device can be preset to mutually supporting information (such as a protocol version and a root CA ID) based on information that is contained in the received hello messages.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. A digital rights management (DRM) method comprising:
configuring at least one processor of a portable storage device to perform the functions of:
receiving a hello message request from a host device, wherein the hello message request includes at least a list of certificate revocation list (CRL) information;
comparing first information included in the hello message request to stored second information;
generating an error code when the first information is unsupported information; and
generating a hello message response that contains the error code, wherein the hello message response is a hello message in response to the hello message request,
wherein the host device transmits the hello message request to the portable storage device instantaneously upon being connected to the portable storage device,
wherein, after the hello message request and the hello message response are exchanged, the host device and the portable storage device perform a mutual authentication process during which the host device and the portable storage device exchange certificates and random numbers in order for each of the host device and the portable storage device to generate a common session key.

2. The method of claim 1, wherein the hello message request comprises a protocol version, a root certification authority (CA) ID list, and a certificate revocation list (CRL) information list of the host device.

3. The method of claim 1, wherein the hello message response comprises a protocol version, a certificate revocation list (CRL) information list, a root certification authority (CA) ID list of the portable storage device, and an error code.

4. The method of claim 1, wherein the error code comprises at least one of an invalid protocol version, an invalid certification authority (CA) ID, and an unknown error.

5. The method of claim 1, further comprising checking, by the portable storage device, certificate revocation list (CRL) information lists of the host device and the portable storage device and determining whether a CRL issuer ID of each piece of CRL information included in the CRL information list of the host device exists in the CRL information list of the portable storage device.

6. A digital rights management (DRM) method comprising:
configuring at least one processor of a host device to perform the functions of:
receiving a hello message response from a portable storage device;
checking whether the hello message response contains an error code;
comparing first information contained in the hello message response to stored second information if the hello message response contains the error code; and
selecting one of the first and the second information, which is supported by the portable storage device,
wherein the host device transmits a hello message request, which includes at least a list of certificate revocation list (CRL) information, to the portable storage device instantaneously upon being connected to the portable storage device, and the portable storage device transmits the hello message response to the host device in response to receiving the hello message request, and
wherein, after the hello message request and the hello message response are exchanged, the host device and the portable storage device perform a mutual authentication process during which the host device and the portable storage device exchange certificates and random numbers in order for each of the host device and the portable storage device to generate a common session key.

7. The method of claim 6, further comprising transmitting a hello message request to the portable storage device to sense the portable storage device.

8. The method of claim 7, wherein the hello message request comprises a protocol version, a root certification authority (CA) ID, and a certificate revocation list (CRL) information list of the host device.

9. The method of claim 6, wherein the hello message response comprises a protocol version, a certificate revocation list (CRL) information list, a root certification authority (CA) ID list of the portable storage device, and an error code.

10. The method of claim 6, wherein the error code comprises at least one of an invalid protocol version, an invalid certification authority (CA) ID, and an unknown error.

11. The method of claim 10, further comprising selecting a protocol version supported by the portable storage device if the error code is a protocol version error code and searching for a root CA ID supported by the portable storage device if the error code is a root CA ID error code.

12. The method of claim 6, further comprising comparing certificate revocation list (CRL) information lists if the hello message response does not contain the error code.

13. The method of claim 6, wherein in response to no error code indicated in the hello message response, checking, by the host device, certificate revocation list (CRL) information lists of the host device and the portable storage device by comparing at least a CRL issuance date on the said lists of both devices.

14. A portable storage device comprising:
a transmission and reception unit which receives a hello message request from a host device, wherein the hello message request includes at least a list of certificate revocation list (CRL) information;
an information check unit which compares first information included in the hello message request to stored second information;
an error code generation unit which generates an error code when the first information is unsupported information; and
a message generation unit which generates a hello message response that contains the error code,
wherein the hello message response is a hello message in response to the hello message request,
at least one of the transmission and reception unit, the information check unit, the error code generation unit and the message generation unit comprises at least one processor, and
the host device transmits a hello message request to the portable storage device instantaneously upon being connected to the portable storage device, and
wherein, after the hello message request and the hello message response are exchanged, the host device and the portable storage device perform a mutual authentication process during which the host device and the portable storage device exchange certificates and random numbers in order for each of the host device and the portable storage device to generate a common session key.

15. The device of claim 14, wherein the hello message request comprises a protocol version, a root certification authority (CA) ID, and a certificate revocation list (CRL) information list of the host device.

16. The device of claim 14, wherein the hello message response comprises a protocol version, a certificate revocation list (CRL) information list of the portable storage device, a root certification authority (CA) ID list, and an error code.

17. The device of claim 14, wherein the error code comprises at least one of an invalid protocol version, an invalid certification authority (CA) ID, and an unknown error.

18. The device of claim 14, the information check unit checks certificate revocation list (CRL) information lists of the host device and the portable storage device and determines whether a CRL issuer ID of each piece of CRL information included in the CRL information list of the host device exists in the CRL information list of the portable storage device.

19. A host device comprising:
a transmission and reception unit which receives a hello message response from a portable storage device;
an information check unit which compares first information contained in the hello message response to stored second information; and
a control unit which selects one of the first and the second information, which is supported by the portable storage device if the hello message response contains an error code,
wherein at least one of the transmission and reception unit, the information check unit and the control unit comprises at least one processor, and
the host device transmits a hello message request, which includes at least a list of certificate revocation list (CRL) information, to the portable storage device instantaneously upon being connected to the portable storage device, and the portable storage device transmits the hello message response to the host device in response to receiving the hello message request, and
wherein, after the hello message request and the hello message response are exchanged, the host device and the portable storage device perform a mutual authentication process during which the host device and the portable storage device exchange certificates and random numbers in order for each of the host device and the portable storage device to generate a common session key.

20. The device of claim 19, further comprising a message generation unit which generates a hello message request to sense the portable storage device after the host device is connected to the portable storage device.

21. The device of claim 20, wherein the hello message request comprises a protocol version, a root certification authority (CA) ID, and a certificate revocation list (CRL) information list of the host device.

22. The device of claim 19, wherein the hello message response comprises a protocol version, a certificate revocation list (CRL) information list of the portable storage device, a root certification authority (CA) ID list, and an error code.

23. The device of claim 19, wherein the control unit selects a protocol version supported by the portable storage device if the error code is a protocol version error code and searches for a root certification authority (CA) ID supported by the portable storage device if the error code is a root CA ID error code.

24. The device of claim 19, wherein the information check unit compares certificate revocation list (CRL) information lists of the host device and the portable storage device if the hello message response does not contain the error code.

25. The device of claim 19, wherein in response to no error code indicated in the hello message response, the information check unit checks certificate revocation list (CRL) information lists of the host device and the portable storage device by comparing at least a CRL issuance date on the said lists of both devices.

26. A digital rights management (DRM) apparatus comprising:
a portable storage device which receives a hello message request which includes at least a list of certificate revocation list (CRL) information, from a host device, compares first information included in the hello message request to stored second information, and generates a hello message response which is a hello message generated in response to the hello message request; and
a host device which receives the hello message response from the portable storage device and selects one of the first and the second information, which is supported by the portable storage device, if the hello message response contains an error code,
wherein the host device transmits the hello message request to the portable storage device instantaneously upon being connected to the portable storage device, and wherein, after the hello message request and the hello message response are exchanged, the host device and the portable storage device perform a mutual authentication process during which the host device and the portable storage device exchange certificates and random numbers in order for each of the host device and the portable storage device to generate a common session key.

27. The apparatus of claim 26, wherein the host device and the portable storage device support root certification authority (CA) certificates and root CA IDs issued by one or more root CAs.

28. The apparatus of claim 26, wherein the host device and the portable storage device support certificate revocation list (CRL) information issued by one or more CRL issuers.

29. The apparatus of claim 26, wherein in response to no error code indicated in the hello message response, the host device checks certificate revocation list (CRL) information lists of the host device and the portable storage device by comparing at least a CRL issuance date on the said lists of both devices.

* * * * *